(12) United States Patent
Cutting et al.

(10) Patent No.: US 6,501,839 B1
(45) Date of Patent: Dec. 31, 2002

(54) METHOD AND APPARATUS FOR EQUITABLE CALL DELIVERY

(75) Inventors: Simon Cutting, San Jose, CA (US); Raechel Crosby, San Jose, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/328,262

(22) Filed: Jun. 16, 1999

(51) Int. Cl.[7] .............................................. H04M 3/00
(52) U.S. Cl. .............................. 379/265.03; 379/266.01
(58) Field of Search ..................... 379/265.01, 265.03, 379/265.08, 265.1, 266.01, 266.04

(56) References Cited

U.S. PATENT DOCUMENTS

| | | | |
|---|---|---|---|
| 4,953,204 A | 8/1990 | Cuschleg, Jr. et al. ...... 379/266 |
| 5,247,569 A | 9/1993 | Cave ........................... 379/113 |
| 5,265,157 A | 11/1993 | Jolissaint et al. ............ 379/386 |
| 5,381,415 A | 1/1995 | Mizutani .................. 370/110.1 |
| 5,530,744 A | 6/1996 | Charalambous et al. .... 379/265 |
| 5,592,542 A | 1/1997 | Honda et al. ................ 379/265 |
| 5,727,047 A | 3/1998 | Bentley et al. ................ 379/93 |
| 6,021,428 A * | 2/2000 | Miloslavsky ................ 709/206 |
| 6,130,933 A * | 10/2000 | Miloslavsky ................ 379/265 |
| 6,175,564 B1 * | 1/2001 | Miloslavsky et al. ........ 379/265 |
| 6,259,774 B1 * | 7/2001 | Miloslavsky ................ 379/265 |
| 6,373,836 B1 * | 4/2002 | Deryugin et al. ...... 379/265.03 |

* cited by examiner

*Primary Examiner*—Creighton Smith
(74) *Attorney, Agent, or Firm*—Chapin & Huang, L.L.C.; Barry W. Chapin

(57) ABSTRACT

Apparatus and method for performing an equitable routing of calls within an automatic call distributor where calls are transferred to agent terminals from two sources, one controlled by switching equipment and the other controlled by a server. The server detects receipt of a call by a queue within the switching equipment and it determines whether other calls are waiting to be routed in the switching equipment. If other calls are waiting, the server withholds ready status of the agent terminals from the queue until the waiting calls are processed so that the switching equipment does not attempt to transfer calls from the source it controls, potentially conflicting with the waiting calls.

23 Claims, 3 Drawing Sheets

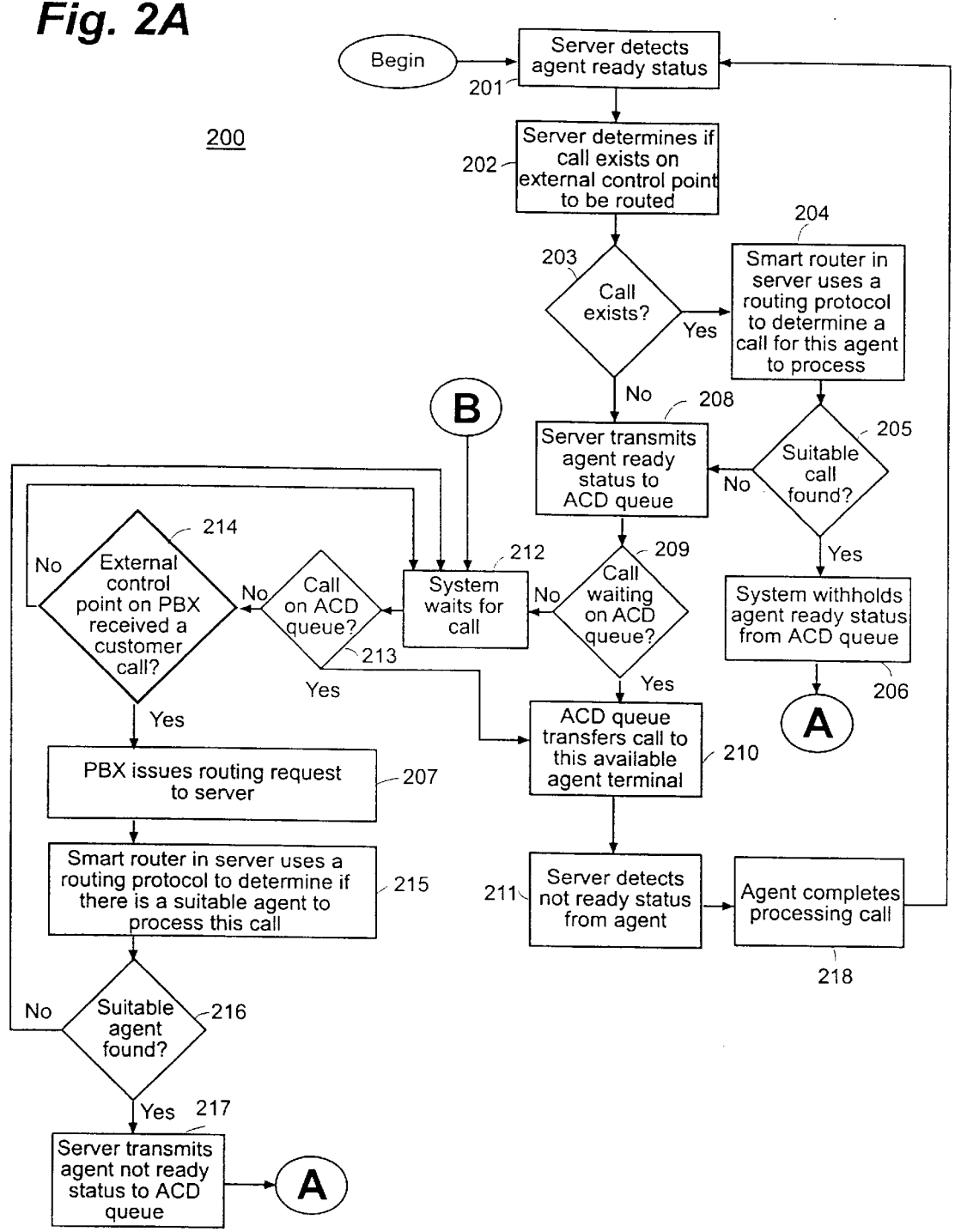

METHOD AND APPARATUS FOR EQUITABLE CALL DELIVERY

REFERENCE TO RELATED APPLICATION

The present application is related to United States patent application of Simon Cutting and Raechel Crosby, filed on even date herewith, and entitled "Method and Apparatus for Robust Call Routing," which is incorporated herein by reference as if fully set forth.

FIELD OF THE INVENTION

The present invention relates to an apparatus and method for delivery of calls from two different mechanisms (one of which is an automatic call distributor) in order to route calls robustly from customers to agents.

BACKGROUND OF THE INVENTION

Automatic call distributors (ACDs), also referred to as automatic call distribution systems, are computerized queues which are an adjunct to a private branch exchange (PBX) and route calls from customers waiting in the queue to agents who are members of the queue. Such systems are used, for example, in a company's customer service department receiving a high volume of calls. In order to efficiently process the incoming calls, the ACD selects an appropriate agent for a particular call and routes the call to a terminal for the agent. The agent terminal typically includes an associated computer so that the agent may access information from a database relevant to processing customer calls, such as relevant customer service information.

In some systems, incoming calls may be routed both by the ACDs within a PBX and other external processes. These external processes can achieve call control functionality at external control points within the PBX. However, if both the ACD and some external routing process attempt to simultaneously transfer calls to the same agent terminal, a situation referred to as a call collision may occur. In this situation, a call transferred from the ACD arrives first at the agent terminal and a time delay occurs in the external process being notified via a computer telephony integration (CTI) link that the agent terminal is busy. Before receiving the busy notification, the external routing process directs the PBX to route its call to the agent terminal as well, and that call will receive a busy signal, since the agent is processing the call from the ACD. Having received a busy signal, the call is unrecoverable from the PBX and hence lost, meaning that the caller must retry the call in order to obtain a connection with an agent. Lost calls reduce the effectiveness of an ACD in processing customer calls and result in poor customer service.

Accordingly, a need exists for an improved method of routing calls in a telephone system and for routing of calls from multiple sources to agents.

SUMMARY OF THE INVENTION

A method consistent with the present invention includes detecting particular status changes of agent terminals and determining whether there are calls waiting to be routed by an external router process to the agent terminals. Based upon the determining, a particular status of agent terminals is selectively transmitted to switching equipment for use by the switching equipment in routing a call to one of the agent terminals.

An apparatus consistent with the present invention detects particular status changes of agent terminals and determines whether there are calls waiting to be routed by an external router process to the agent terminals. Based upon the determining, the apparatus selectively transmits a particular status of agent terminals to switching equipment for use by the switching equipment in routing the call to one of the agent terminals.

BRIEF DESCRIPTION OF THE DRAWINGS

The accompanying drawings are incorporated in and constitute a part of this specification and, together with the description, explain the advantages and principles of the invention. In the drawings, FIGS. 2A and 2B are a flow chart of a process for performing equitable routing and recoverable routing of customer calls in the system of FIG. 1.

DETAILED DESCRIPTION

A system consistent with the present invention controls routing of calls to agent terminals to avoid call collision and loss of calls. The system may include two different sources of calls for distribution to agent terminals, one source controlled by a PBX or other switching equipment and another source controlled by a server. The server monitors ready status of the agent terminals to determine which agent terminal is ready to receive a call, and the server determines if there are calls waiting for distribution to agent terminals that it controls. Until the server has processed calls by routing them through the source it controls, it does not pass on to ACD queues on the PBX ready status of the agent terminals. By temporarily withholding ready status from the ACD queues on the PBX, the server helps ensure that the two sources do not attempt to simultaneously route a call to the same agent terminal. The withholding of the ready status may occur by not transmitting the ready status or by transmitting a not ready status to the PBX.

In addition, for calls processed from the server-controlled source, the system performs a recoverable routing of the calls to the agent terminals. The system uses intermediate telephones in order to intercept a call from the PBX. Upon intercepting the call, the system maintains control of the call so that if the intended agent terminal is busy, the system may redirect the call for further processing and to avoid losing the call. The system maintains an identification of the intermediate telephones and may direct the PBX to transfer the customer calls to one of the intermediate telephones via a specified smart router ACD queue. This use of intermediate telephones avoids routing calls directly to a particular directory number and hence avoids loss of the call if an agent terminal is busy.

Figure 1:
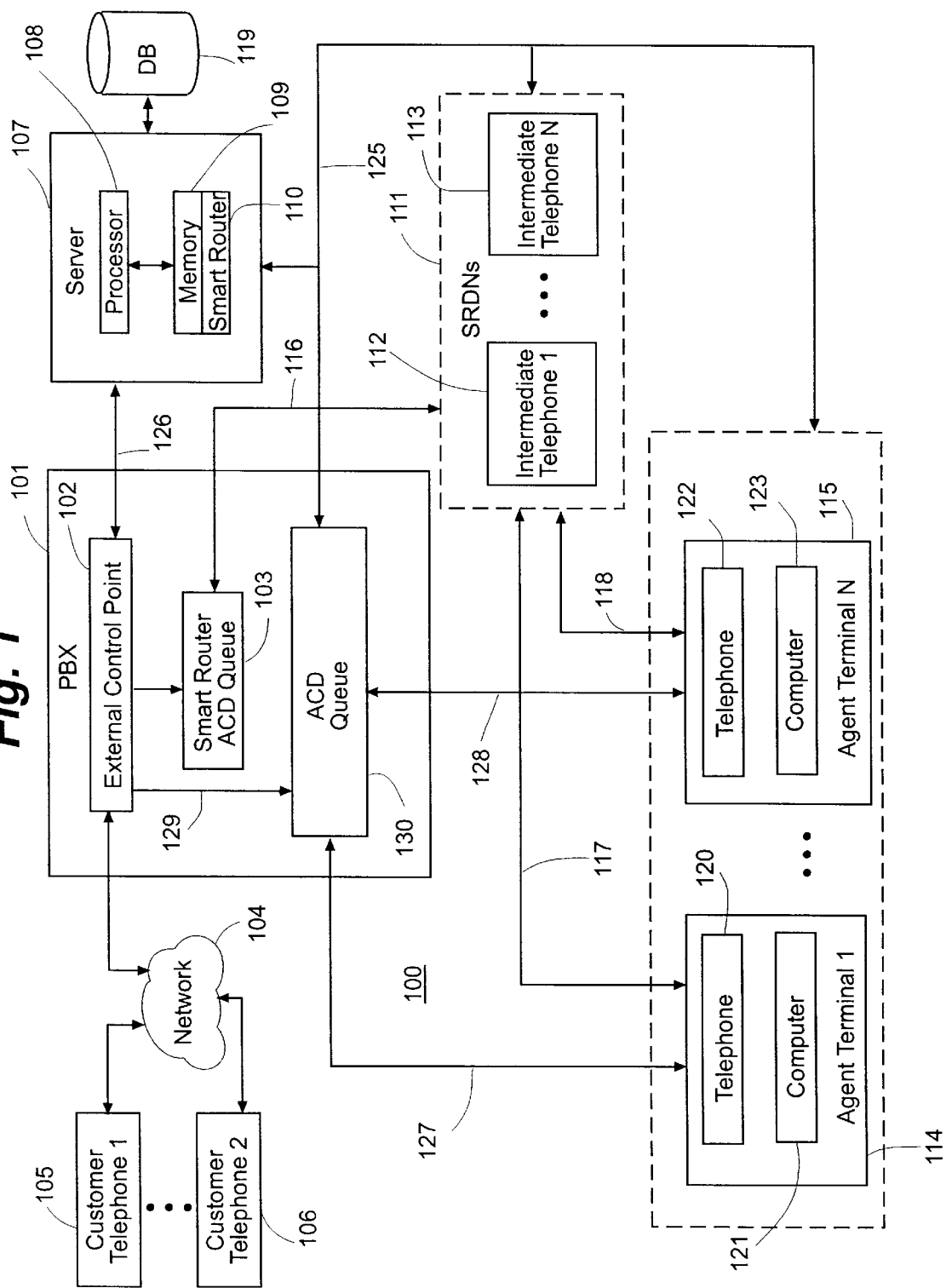
FIG. 1 is a block diagram of an exemplary system for performing equitable routing and recoverable routing of customer calls to agent terminals.

FIG. 1 is a block diagram of an exemplary system 100 for performing equitable routing and recoverable routing of customer calls to agent terminals. System 100 includes a PBX 101, which alternatively may be implemented with any type of switching equipment for routing calls. PBX 101 includes an external control point 102, a standard feature of a typical PBX. The phrase "external control point" refers to a point within switching equipment where an external router process can determine, if desired, the route destination of calls arriving at the point. In addition, PBX 101 includes a smart router ACD queue 103, which functions as a holding point for routing of calls to an available agent terminal or other telephones. Smart router ACD queue 103 represents a queue reserved for the exclusive use of server 107, which provides an address or other information to PBX 101 for routing calls to smart router ACD queue 103. Only server 107 routes calls to smart router ACD queue 103 in this example; a customer cannot call the queue directly, and scripts or other functions in PBX 101 cannot route to it.

PBX 101 also includes an ACD queue 130 capable of receiving calls routed through switches, represented by a path 129. ACD queue 130 represents a queue controlled by PBX 101; for example, ACD queue 130 may be accessed by a customer calling a particular directory number and, in response, PBX 101 routes the call to ACD queue 130 using scripts or other functions. Therefore, in this example PBX 101 includes two mechanisms for receiving calls and routing the calls to agent terminals: external control point 102 controlled by server 107 and ACD queue 130 controlled by PBX 101. The terms "smart router ACD queue" and "ACD queue" are used only as labels for the queues, and a "queue" for implementing an embodiment consistent with the present invention may include any type of mechanism for holding or controlling routing of calls.

PBX 101 is coupled to a network 104, which receives customer calls from customer telephones 105 and 106. Customer telephones 105 and 106 may be implemented with any type of wireline or wireless telephone for voice communication, and the term "customer" is used only as a label, since ACDs are often used in an environment to service customers. However, customer telephones 105 and 106 may be used by anyone calling into PBX 101. Network 104 may include any type of network for routing calls, such as a public switched telephone network (PSTN), or other wide area or local area network.

PBX 101 is also coupled by external control point 102 to server 107 via connection 126. Server 107 may be implemented with any type of computer providing for CTI or other functions in order to manage the routing and distribution of customer calls from customer telephones 105 and 106. Server 107 includes a processor 108 coupled to a memory 109 for storing data and applications for execution by processor 108. Memory 109 stores an application referred to as a smart router 110 for providing processing to perform equitable routing and recoverable routing of customer calls. Server 107 may also be coupled to a database 119 providing secondary storage of information potentially relevant to customer calls. Therefore, server 107 may implement functions of an external router process, which includes any process for controlling routing of calls in connection with associated switching equipment. An example of an external router process is the functionality provided by the Customer Contact Manager product by Hewlett-Packard Company.

PBX 101 via smart router ACD queue 103 is also coupled via connection 116 to a plurality of smart router directory numbers (SRDNs) 111, implemented using intermediate telephones 112 and 113. The term "SRDN" is used only as a label to identify the intermediate telephones by their directory numbers for purposes of routing calls. These intermediate telephones 112 and 113 may be implemented with conventional physical telephones, such as a telephone handset, coupled via switches to smart router ACD queue 103 in PBX 101. Alternatively, SRDNs 111 may be implemented with ports within the PBX 101 equipment. However, in some instances implementation may be facilitated by using external physical telephones rather than extensive modification of existing PBX equipment. Each of the intermediate telephones 112 and 113 in SRDNs 111 may be coupled to one of a plurality of agent terminals 114 and 115 via connections 117 and 118. Connections 117 and 118 typically are implemented by routing a call from one of the intermediate telephones 112 and 113 through a switch to the appropriate agent terminal. PBX 101 via ACD queue 130 is also coupled directly to agent terminals 114 and 115, represented by connections 127 and 128, respectively. Connections 127 and 128 are also typically implemented by routing a call from ACD queue 130 through a switch to the appropriate agent terminal.

Agent terminals 114 and 115 may be implemented with typical agent terminals within an ACD system. The terminals may include a telephone 120 and an associated computer 121 for agent terminal 114, and a telephone 122 and an associated computer 123 for agent terminal 115. The exemplary telephone in the agent terminal provides for voice communication with a customer during a customer call. The associated computer in the agent terminal may be linked via a CTI interface 125 with server 107 for accessing information in database 119 potentially relevant to the customer or for use in processing the customer call. Therefore, computer 121 and computer 123 may each include a processor, a memory for storing data and applications for execution by the processor, a display device such a conventional computer monitor, and an input device such as a keyboard or cursor control device. An agent at one of the agent terminals 114 and 115 may thus process a customer call using a telephone and associated computer for entering and retrieving information relevant to the customer.

CTI interface 125 provides for server 107 to control transfer of calls from intermediate telephones 112 and 113 in SRDNs 111 to agent terminals 114 and 115. CTI interface 125 includes a connection to each of the intermediate telephones 112 and 113, and CTI interface 125 is also coupled to computers 121 and 123 within agent terminals 114 and 115 such as that an agent at those terminals may access information in server 107 or database 119 for processing customer calls. CTI interface 125 is also connected to telephones 120 and 122 in agent terminals 114 and 115 for use in transferring calls to those telephones and so that server 107 may monitor a status of agent terminals 114 and 115. Server 107 is also connected via CTI interface 125 with ACD queue 130 to transmit a status of agent terminals 114 and 115 to ACD queue 130.

CTI interfaces are known in the art with respect to, for example, known ACD systems. Although agent terminals 114 and 115 are shown with computers 121 and 123, respectively, agent terminals may include a telephone without an associated computer, and in addition agent terminals may include a stand-alone computer without connection to a CTI interface. In addition, CTI interface 125 may be implemented with any type of connection for monitoring and controlling the routing of calls. Although only two intermediate telephones and two agent terminals are shown, system 100 may include any number of intermediate telephones and agent terminals.

Figure 2B:
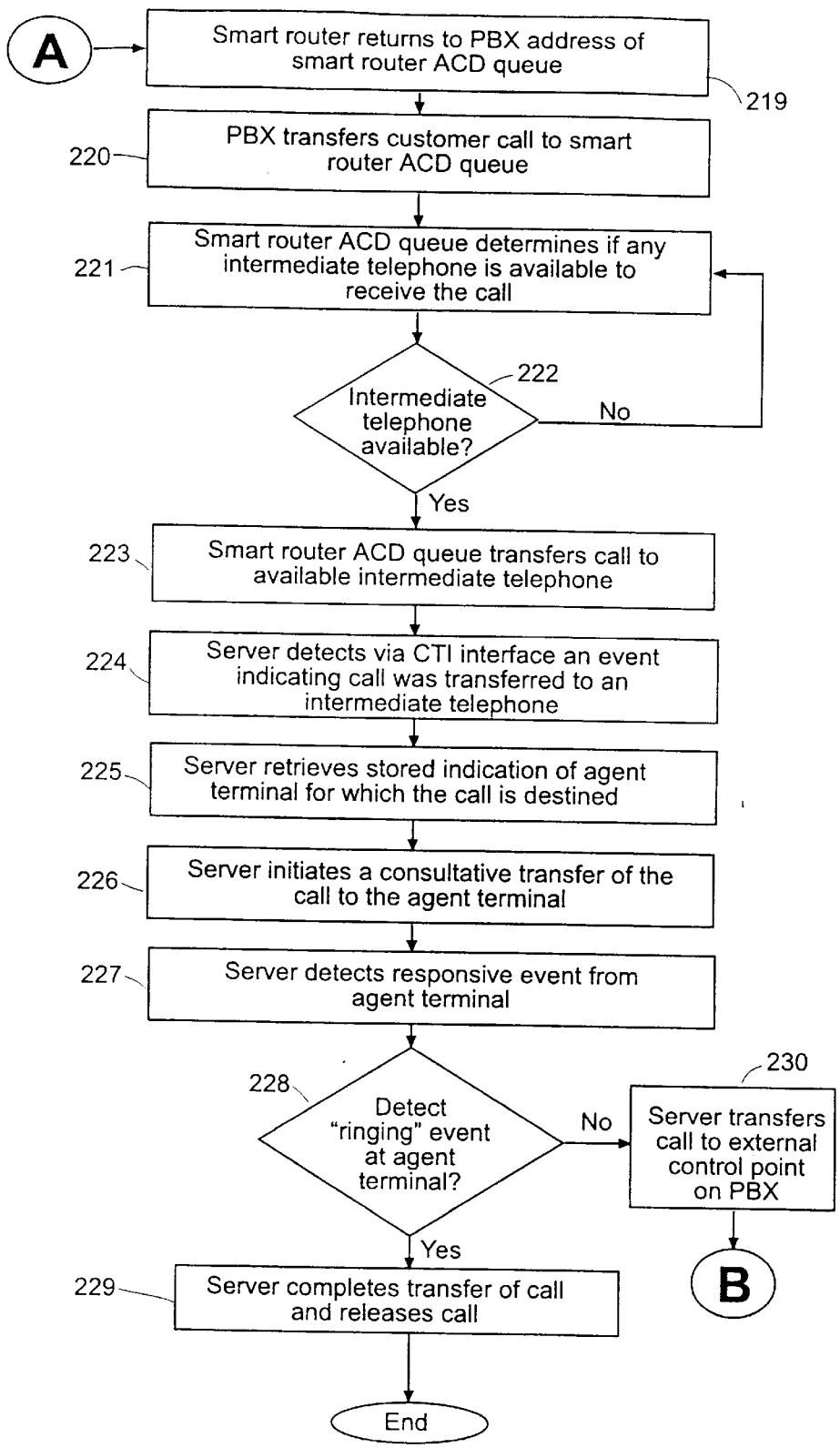

FIGS. 2A and 2B are a flow chart of a process 200 for performing equitable and recoverable routing of customer calls in system 100. Process 200 may be implemented as smart router application 110 in memory 109 for execution by processor 108 in server 107, and process 200 thus includes an external router process for controlling routing of calls through PBX 101. Server 107, upon executing process 200, may use CTI interface 125 to control the routing of customer calls from PBX 101, and server 107 may execute process 200 for each particular agent terminal 114 and 115. Therefore, process 200 may be implemented by software modules stored in memory 109 or received from another source, or alternatively by hardware modules or a combination of software and hardware modules. In addition, the application or other information for executing the process may also be stored on or read from other types of computer program products or computer-readable media, such as secondary storage devices, including hard disks, floppy disks, or CD-ROM; a signal from a network; or other forms of RAM or ROM. The computer-readable media may include instructions for controlling a computer system, such as processor 108, to perform a particular method such as that shown in FIGS. 2A and 2B.

In process 200, server 107 receives a notification through CTI interface 125 that an agent terminal now has ready status (step 201). In response, server 107 determines if a call exists on external control point 102 to be routed (step 202). It may make that determination by communicating with external control point 102 via connection 126. If a call is waiting on external control point 102 (step 203), server 107 may choose to route the call to an agent terminal 114 or 115 by applying routing protocols (step 204). If a suitable call is found (step 205), server 107 withholds agent terminal ready status from ACD queue 130 to avoid potential call collision (step 206). The withholding of ready status may occur by not transmitting the ready status or by transmitting a not ready status. The status of the agent terminals includes any type of indication whether the agent terminal is available to receive a call; it typically includes the work modes of agent terminals 114 or 115, identifying whether a particular agent terminal is "ready" (available to receive a call) or "not ready" (not available to receive a call).

If a call was not waiting at external control point 102 (step 203), or the server 107 chooses not to route a call to this agent, as determined by a particular routing protocol used in steps 204 and 205, server 107 transmits agent ready status to ACD queue 130 (step 208). In response to the agent ready status, if ACD queue 130 has a call waiting to be routed (step 209), ACD queue 130 transfers the call to an available one of the agent terminals 114 or 115 (step 210). Known PBX's typically include a hardware mechanism to determine which associated agent terminals are available to receive a call. After one of the agent terminals has received the call, server 107 via CTI interface 125 detects the agent terminal's not ready status for use in processing other incoming calls (step 211).

If ACD queue 130 had no calls waiting to be routed (step 209), the system requires no additional action with respect to the agent terminal status in this example and it waits for another call (step 212). If a call is received on ACD queue 130 (step 213), ACD queue 130 transfers the call to an available one of the agent terminals 114 or 115 (step 210). Again, after an agent terminal has received the call, server 107 via CTI interface 125 detects the agent terminal's not ready status for use in processing other incoming calls (step 211). When the agent completes processing the call at the corresponding agent terminal 114 or 115 (step 218), server 107 receives a notification through CTI interface 125 that the agent terminal now has ready status (step 201).

Server 107 determines if a call was received at external control point 102 (step 214). If it did not receive a call, the system waits for another call (step 212). If external control point 102 did receive a call, PBX 101 issues a routing request to server 107 via connection 126 (step 207), and server 107 determines using a routing protocol if there is an available agent to process this call (step 215). The routing request may include an identification of the customer call. For example, in certain ACD systems, a PBX may be programmed to prompt a caller with particular questions and in response received to numbers entered via a touch-tone telephone. PBX 101 may thus transmit that information providing some identification of the customer call to server 107. In response, smart router 110 upon execution by processor 108 uses a routing protocol to determine an agent to process the customer call, and it stores in memory 109 an indication of the agent's terminal for future reference in routing the call. If such an agent is found (step 216), server 107 transmits agent not ready status to ACD queue 130 (step 217). If a suitable agent is not found (step 216), the system waits for another call (step 212) and the call being processed remains pending at external control point 102.

Routing protocols or routing rules are known in the art and may use the received information identified in the customer call in order to select an appropriate agent for processing the call. For example, smart router 110 may access in memory 109 a stored order of agent terminals and sequence through the agent terminals to assign the call to the first available agent. As another example of a routing protocol, smart router 110 may assign the call to the agent terminal that has handled the fewest number of pending calls within a particular time frame. Vendors of ACDs typically define their own routing protocols for use with associated switching equipment; for example, the Customer Contact Manager product identified above has its own routing protocol.

After server 107 withholds agent ready status or transmits an agent not ready status in steps 206 and 217, smart router 110 executes the following processing. In response to the routing request received in step 207 or the determination of a call for the agent to process in steps 204 and 205, smart router 110 via server 107 returns to PBX 101 an address of smart router ACD queue 103 (step 219). Therefore, instead of returning the direct address of the selected agent terminal, server 107 instead returns an address of smart router ACD queue 103 so that PBX will transfer the call to that queue and server 107 will retain control of the customer call. The address of smart router ACD queue 103 includes information identifying a location of the queue, such as a directory number, to enable PBX 101 to transfer a call to that queue.

PBX 101 transfers the customer call from external control point 102 to smart router ACD queue 103 using the received address from server 107 (step 220). Smart router ACD queue 103 determines if any intermediate telephone in SRDNs 111 are available to receive the call (step 221). This process may be accomplished by determining a state of agent terminals 114 and 115 as well as by analyzing which agent terminals are "punched into" to smart router ACD queue 103. The phrase "punched into" means that smart router ACD queue 103 includes a directory number for a particular intermediate telephone and knows that a particular intermediate telephone is available to receive a call. Therefore, smart router ACD queue 103 only transfers a call to an intermediate telephone that is punched into the smart router ACD queue. Switches in known PBX equipment typically use a hardware mechanism to identify which telephones are punched into a queue in the PBX and to automatically transfer calls from the queue to one of those telephones. Using a queue, such as smart router ACD queue 103, also ensures that calls will not be lost between external control point 102 and SRDNs 111; smart router ACD queue 103 thus may function as a holding point for calls while an available one of the SRDNs 111 is identified.

If one of the intermediate telephones 112 or 113 in SRDNs 111 is available to receive a call (step 222), smart router ACD queue 103 transfers the customer call to the available intermediate telephone 112 or 113 (step 223). By monitoring CTI interface 125, server 107 detects via CTI interface 125 an event indicating the customer call was transferred to one of the intermediate telephones 112 or 113 (step 224). Events for monitoring calls are known in the art with respect to CTI, and an event includes any type of information providing an indication of a status of a call. In response, server 107 retrieves the stored indication of the agent terminal 114 or 115 for which the call is destined, as determined by the routing protocol in steps 204 or 215 (step 225).

Server 107 then initiates a consultative transfer to the agent terminal for which the call is destined in order to determine if the agent terminal is available to receive the customer call (step 226). A consultative transfer refers to an example of a transfer to implement a recoverable routing such that, if the attempted transfer of the call to a busy or otherwise unavailable agent terminal occurs, control of the call is maintained in order to reroute it and to help prevent loss of the call. The consultative transfer may be accomplished by a consult call in which server 107 consults an agent terminal to determine if it is available by attempting to connect a call with the agent terminal; if it receives a "busy" signal it does not transfer the call, and if it receives a "ringing" indication it does transfer the call. The consultative transfer thus may be implemented by the customer call being on hold within the intermediate telephone 112 or 113 and by server 107 attempting to access the agent terminal telephone 120 or 122 and determining if it receives a ringing event in response. Therefore, server 107 detects via CTI interface 125 responsive event from the agent terminal when it tries to establish a connection with the agent terminal (step 227).

If server 107 detects a ringing event at the agent terminal 114 or 115, indicating successful transfer to the agent terminal (step 228), server 107 completes the transfer of the call from the intermediate telephone 112 or 113 to the agent terminal and releases its control of the call so that it may be processed by the agent terminal (step 229). A ringing event is known in CTI and provides an indication that the call is "ringing" at the agent terminal to which it was transferred, or otherwise having been successfully transferred, and is waiting to be answered at the agent terminal. If server 107 did not detect a ringing event and instead detected, for example, a busy event, server 107 transfers the customer call to external control point 102 on PBX 101 so that the call may again be processed beginning at step 212 to avoid the customer call receiving a busy signal and being lost in connection with transfer to an agent terminal (step 230).

While the present invention has been described in connection with an exemplary embodiment, it will be understood that many modifications will be readily apparent to those skilled in the art, and this application is intended to cover any adaptations or variations thereof. For example, different switching equipment and types of agent terminals may be used without departing from the scope of the invention. This invention should be limited only by the claims and equivalents thereof.

What is claimed is:

1. A method for routing calls to one of a plurality of agent terminals through a telephone network, comprising:
   detecting particular status changes of agent terminals;
   determining whether calls are waiting to be routed by an external router process to the agent terminals; and
   selectively transmitting, based upon the determining, a particular status of the agent terminals to associated switching equipment for use by the switching equipment in routing a call to one of the agent terminals.

2. The method of claim 1, further including detecting a status of the agent terminals.

3. The method of claim 1 wherein the transmitting step includes transmitting a ready status to the switching equipment, the ready status indicating that a particular one of the agent terminals is available to receive the call.

4. The method of claim 1 wherein the transmitting step includes transmitting a not ready status to the switching equipment, the not ready status indicating that a particular one of the agent terminals is not available to receive the call.

5. The method of claim 1, further including
   receiving from the switching equipment a routing request for the call;
   returning an indication of an address for a queue in response to the routing request;
   detecting transfer of the call from the queue to an intermediate telephone;
   obtaining control of the call at the intermediate telephone; and
   performing a recoverable routing of the call from the intermediate telephone to one of the plurality of agent terminals.

6. The method of claim 5 wherein the performing step includes:
   determining that the one agent terminal is unavailable; and
   transferring the call back to the switching equipment in response to the determining.

7. The method of claim 5 wherein the performing step includes:
   performing a consultative transfer of the call from the intermediate telephone to the one agent terminal; and
   detecting an event providing an indication whether the call was successfully transferred to the one agent terminal.

8. The method of claim 7 wherein the performing step includes transferring the call back to the switching equipment, if the event indicates that the call was not successfully transferred to the one agent terminal.

9. The method of claim 7 wherein the performing step includes releasing control of the call, if the event indicates that the call was successfully transferred to the one agent terminal.

10. An apparatus for routing calls to one of a plurality of agent terminals through a telephone network, comprising:
    a module for detecting particular status changes of agent terminals;
    a module for determining whether calls are waiting to be routed by an external router process to the agent terminals; and
    a module for selectively transmitting, based upon the determining, a particular status of the agent terminals to associated switching equipment for use by the switching equipment in routing the call to one of the agent terminals.

11. The apparatus of claim 10, further including a module for detecting a status of the agent terminals.

12. The apparatus of claim 10 wherein the transmitting module includes a module for transmitting a ready status to the switching equipment, the ready status indicating that a particular one of the agent terminals is available to receive the call.

13. The apparatus of claim 10 wherein the transmitting module includes a module for transmitting a not ready status to the switching equipment, the not ready status indicating that a particular one of the agent terminals is not available to receive the call.

14. The apparatus of claim 10, further including
a module for receiving from the switching equipment a routing request for the call;
a module for returning an indication of an address for a queue in response to the routing request;
a module for detecting transfer of the call from the queue to an intermediate telephone;
a module for obtaining control of the call at the intermediate telephone; and
a module for performing a recoverable routing of the call from the intermediate telephone to one of the plurality of agent terminals.

15. The apparatus of claim 14 wherein the performing module includes:
a module for determining that the one agent terminal is unavailable; and
a module for transferring the call back to the switching equipment in response to the determining.

16. The apparatus of claim 14 wherein the performing module includes:
a module for performing a consultative transfer of the call from the intermediate telephone to the one agent terminal; and
a module for detecting an event providing an indication whether the call was successfully transferred to the one agent terminal.

17. The apparatus of claim 16 wherein the performing module includes a module for transferring the call back to the switching equipment, if the event indicates that the call was not successfully transferred to the one agent terminal.

18. The apparatus of claim 16 wherein the performing module includes a module for releasing control of the call, if the event indicates that the call was successfully transferred to the one agent terminal.

19. A system for routing calls to one of a plurality of agent terminals through a telephone network, comprising:
switching equipment for routing calls;
a plurality of agent terminals operatively coupled to receive calls from the switching equipment; and
a processor, operatively coupled to the switching equipment and the agent terminals, for controlling routing of calls, the processor operating to:
detect particular status changes of the agent terminals;
determine whether calls are waiting to be routed by an external router process to the agent terminals; and
selectively transmit, based upon the determining, a particular status of the agent terminals to the switching equipment for use by the switching equipment in routing the call to one of the agent terminals.

20. The system of claim 19, further including a plurality of intermediate telephones coupled to receive calls from the switching equipment, and wherein:
the switching equipment includes an associated queue;
the agent terminals are operatively coupled to receive calls from the intermediate telephone; and
the processor is operatively coupled to the intermediate telephones, the processor further operating to:
receive from the switching equipment a routing request for the call;
return an indication of an address for the queue in response to the routing request;
detect transfer of the call from the queue to one of the intermediate telephones;
obtain control of the call at the one intermediate telephone; and
perform a recoverable routing of the call from the one intermediate telephone to one of the plurality of agent terminals.

21. A computer program product having a computer-readable medium including computer program logic encoded thereon that, when performed on a computer system having a coupling of a memory, a processor, and at least one communications interface, provides a method for routing calls to one of a plurality of agent terminals through a telephone network by performing the operations of:
detecting particular status changes of agent terminals;
determining whether calls are waiting to be routed by an external router process to the agent terminals; and
selectively transmitting, based upon the determining, a particular status of the agent terminals to associated switching equipment for use by the switching equipment in routing a call to one of the agent terminals.

22. A method for routing calls to one of a plurality of agent terminals through a telephone network, comprising:
detecting particular status changes of agent terminals;
determining whether calls are waiting to be routed by an external router process to the agent terminals;
selectively transmitting, based upon the determining, a particular status of the agent terminals to associated switching equipment for use by the switching equipment in routing a call to one of the agent terminals; and
if the call is transferred to an intermediate telephone, performing a the call to one of the plurality of agent terminals.

23. An apparatus for routing calls to one of a plurality of agent terminals through a telephone network, comprising:
a module for detecting particular status changes of agent terminals;
a module for determining whether calls are waiting to be routed by an external router process to the agent terminals;
a module for selectively transmitting, based upon the determining, a particular status of the agent terminals to associated switching equipment for use by the switching equipment in routing the call to one of the agent terminals; and
a module for performing a recoverable routing of the call to one of the plurality of agent terminals if the call is transferred to an intermediate telephone.

* * * * *

UNITED STATES PATENT AND TRADEMARK OFFICE
CERTIFICATE OF CORRECTION

PATENT NO.    : 6,501,839 B1  
DATED         : December 31, 2002  
INVENTOR(S)   : Simon Cutting and Raechel Crosby Page 1 of 1

It is certified that error appears in the above-identified patent and that said Letters Patent is hereby corrected as shown below:

Column 10,
Line 38, "performing a the call" should read -- performing a recoverable routing of the call --.

Signed and Sealed this

Twenty-second Day of April, 2003

JAMES E. ROGAN
*Director of the United States Patent and Trademark Office*